(12) United States Patent
Kawashima

(10) Patent No.: US 10,371,159 B2
(45) Date of Patent: Aug. 6, 2019

(54) MAGNETIC BEARING DEVICE, AND VACUUM PUMP HAVING SAME

(71) Applicant: Edwards Japan Limited, Yachiyo-shi, Chiba (JP)

(72) Inventor: Toshiaki Kawashima, Yachiyo (JP)

(73) Assignee: Edwards Japan Limited, Yachiyo-shi (JP)

( * ) Notice: Subject to any disclaimer, the term of this patent is extended or adjusted under 35 U.S.C. 154(b) by 321 days.

(21) Appl. No.: 14/783,740

(22) PCT Filed: Mar. 7, 2014

(86) PCT No.: PCT/JP2014/056054
§ 371 (c)(1),
(2) Date: Oct. 9, 2015

(87) PCT Pub. No.: WO2014/171222
PCT Pub. Date: Oct. 23, 2014

(65) Prior Publication Data
US 2016/0252099 A1    Sep. 1, 2016

(30) Foreign Application Priority Data

Apr. 16, 2013   (JP) .................... 2013-086143

(51) Int. Cl.
*H02K 7/09* (2006.01)
*H02K 7/14* (2006.01)
(Continued)

(52) U.S. Cl.
CPC ........ *F04D 29/058* (2013.01); *F16C 32/0451* (2013.01); *F16C 32/0455* (2013.01);
(Continued)

(58) Field of Classification Search
CPC .. F04D 29/058; F04D 19/042; F16C 32/0451; F16C 32/0455; F16C 32/0457;
(Continued)

(56) References Cited

U.S. PATENT DOCUMENTS 4,978,894 A * 12/1990 Takahara ............ H02M 5/4505
318/768
5,373,457 A * 12/1994 George ................. G09B 23/00
327/334
(Continued)

FOREIGN PATENT DOCUMENTS

CN      1710799 A    12/2005
EP      1318310 A1    6/2003
(Continued)

OTHER PUBLICATIONS

Translation of and original International Search Report dated May 27, 2014 in counterpart International Application No. PCT/JP2014/056054, 5 pgs.
(Continued)

*Primary Examiner* — Forrest M Phillips
(74) *Attorney, Agent, or Firm* — Shumaker & Sieffert, P.A.

(57) ABSTRACT

An object of the present invention is to provide a magnetic bearing device designed to achieve reduction in cost and size of a circuit by omitting a DC/DC converter that has been used for obtaining a control power voltage of a magnetic bearing, and to provide a vacuum pump having the magnetic bearing device. The magnetic bearing device has: position detection means for detecting a radial position and an axial position of a rotor; magnetic bearing means for controlling the radial position and the axial position with an electromagnet based on the radial position and the axial position detected by the position detection means; an excitation circuit that includes a switching element for connecting/
(Continued)

disconnecting between the electromagnet and a power supply; electromagnetic current detection means for detecting a signal of a current flowing through the electromagnet; power supply voltage detection means for detecting a signal of a voltage of the power supply; and pulse width calculation means for calculating, at each timing, a pulse width for operating pulse control for the switching element. The pulse width is calculated based on the voltage of the power supply detected by the power supply voltage detection means and the current detected by the electromagnetic current detection means.

20 Claims, 10 Drawing Sheets

(51) Int. Cl.
   *F04D 19/04* (2006.01)
   *F16C 32/04* (2006.01)
   *F04D 29/058* (2006.01)
(52) U.S. Cl.
   CPC ............ *F16C 32/0457* (2013.01); *H02K 7/09* (2013.01); *H02K 7/14* (2013.01); *F04D 19/042* (2013.01); *F16C 32/0489* (2013.01); *F16C 2360/45* (2013.01)
(58) Field of Classification Search
   CPC ... F16C 32/0489; F16C 2360/45; H02K 7/09; H02K 7/14
   USPC ....................................................... 310/90.5
   See application file for complete search history.

(56) References Cited

U.S. PATENT DOCUMENTS

| | | | | |
|---|---|---|---|---|
| 5,627,421 | A | * | 5/1997 | Miller ................. F16C 32/0457 310/51 |
| 5,936,364 | A | * | 8/1999 | Ohsawa .................... H02P 6/00 318/400.27 |
| 6,949,853 | B2 | | 9/2005 | Kawashima |
| 7,091,641 | B2 | | 8/2006 | Kawashima et al. |
| 9,777,612 | B2 | * | 10/2017 | Enomoto ................. F01N 11/00 |
| 2007/0128047 | A1 | * | 6/2007 | Gonnella ................ F04B 13/00 417/2 |
| 2009/0281734 | A1 | * | 11/2009 | Abbata ................... G05B 11/28 702/33 |

FOREIGN PATENT DOCUMENTS

| | | |
|---|---|---|
| EP | 1460293 A2 | 9/2004 |
| JP | 08-074849 A | 3/1996 |
| JP | 2003-172354 B2 | 6/2003 |
| JP | 2003293980 A | 10/2003 |
| JP | 2004-286045 A | 10/2004 |
| JP | 2004-301322 B2 | 10/2004 |
| JP | 2007-252094 A | 9/2007 |
| JP | 2010200524 A | 9/2010 |

OTHER PUBLICATIONS

Search Report from counterpart European Application No. 14786042.3, dated Aug. 1, 2017, 9 pp.

* cited by examiner

MAGNETIC BEARING DEVICE, AND VACUUM PUMP HAVING SAME

This application is a national stage entry under 35 U.S.C. § 371 of International Application No. PCT/JP2014/056054, filed Mar. 7, 2014, which claims the benefit of JP Application 2013-086143, filed Apr. 16, 2013. The entire contents of International Application No. PCT/JP2014/056054 and JP Application 2013-086143 are incorporated herein by reference.

TECHNICAL FIELD

The present invention relates to a magnetic bearing device and a vacuum pump having the magnetic bearing device. In particular, the present invention relates to a magnetic bearing device designed to achieve reduction in cost and size of a circuit by omitting a DC/DC converter that has been used for obtaining a control power voltage of a magnetic bearing, and a vacuum pump having the magnetic bearing device.

BACKGROUND

A magnetic bearing is used in a rotary machine, such as a turbo-molecular pump, that is used in a semiconductor manufacturing step. A conventional magnetic bearing excitation circuit is now described based on a configuration example of a magnetic bearing of a turbo-molecular pump.

FIG. 4 shows a cross-sectional view of the turbo-molecular pump, a configuration example of a magnetic bearing. In FIG. 4, the turbo-molecular pump has a rotor 103 having a plurality of stages of rotor blades 101a, 101b, 101c and the like, which are turbine blades for discharging gas.

A magnetic bearing is configured by disposing an upper radial electromagnet 105a, a lower radial electromagnet 107a, and axial electromagnets 109a, to bear the rotor 103. The turbo-molecular pump also has an upper radial sensor 105b, a lower radial sensor 107b, and an axial sensor 109b.

The upper radial electromagnet 105a and lower radial electromagnet 107a each have four electromagnets constituted by electromagnetic windings, as shown in a lateral cross-sectional view of FIG. 5. These four electromagnets are disposed in pairs facing each other, to configure a magnetic bearing along two X and Y axes.

Specifically, electromagnetic windings 111 wound around two adjacent core projecting parts are disposed in a pair, with the polarities thereof reversed, thereby configuring a single electromagnet. This electromagnet forms a pair with an electromagnet that is constituted by electromagnetic windings 113 of core projecting parts facing the electromagnetic windings 111 with the rotor 103 therebetween, and these electromagnets pull the rotor 103 in a positive or negative direction along the X axis.

Similarly, in the Y axis perpendicular to the X axis, two electromagnetic windings 115 and two electromagnetic windings 117 facing the electromagnetic windings 115 form a pair of electromagnets facing each other in the direction of the Y axis.

As shown in a longitudinal cross-sectional view of FIG. 6, the axial electromagnets 109a are configured as a pair of electromagnets, with two electromagnetic windings 121, 123 thereof having an armature 103a of the rotor 103 therebetween. These two electromagnets 109a configured respectively with the electromagnetic windings 121, 123 apply suction force in a positive or negative direction of the axis of rotation, to the armature 103a.

The upper radial sensor 105b and the lower radial sensor 107b each consist of four sensing coils corresponding to the electromagnets 105a, 107a and disposed along the two X and Y axes, and detect a radial displacement of the rotor 103. The axial sensor 109b detects an axial displacement of the rotor 103. These sensors are configured to send the detection signals thereof to a magnetic bearing control device, not shown.

Based on the detection signals of these sensors, the magnetic bearing control device executes PID control and the like to individually adjust the suction forces of a total of ten electromagnets configuring the upper radial electromagnet 105a, the lower radial electromagnet 107a, and the axial electromagnets 109a, thereby magnetically suspending and supporting the rotor 103.

Next is described a magnetic bearing excitation circuit that excites and drives each of the electromagnets of the magnetic bearing as described above. FIG. 7 shows an example of a magnetic bearing excitation circuit that controls a current flowing through the electromagnetic windings by means of a pulse width modulation system.

As shown in FIG. 7, one of the electromagnetic winding 111 configuring a single electromagnet has one end thereof connected to a positive electrode of a power supply 133 by a transistor 131 and has the other end connected to a negative electrode of the power supply 133 by a transistor 132.

A cathode of a current regeneration diode 135 is connected to the former end of the electromagnetic winding 111, and an anode of the same is connected to the negative electrode of the power supply b 133. Similarly, a cathode of a diode 136 is connected to the positive electrode of the power supply 133, and an anode of the same is connected to the latter end of the electromagnetic winding 111. An electrolytic capacitor 141 is connected for stabilization between the positive and negative electrodes of the power supply 133.

A current detection circuit 139 is provided at a source side of the transistor 132, and a current detected by this current detection circuit 139 is input to a control circuit 137.

An excitation circuit 110 with the foregoing configuration corresponds to the electromagnetic windings 111. The same excitation circuit 110 is configured for the other electromagnetic windings 113, 115, 117, 121, 123. Therefore, in a 5-axis control magnetic bearing, a total of ten excitation circuits 110 are connected in parallel with the electrolytic capacitor 141.

In this configuration, turning both of the transistors 131, 132 ON leads to an increase of the current, while turning both of the transistors OFF leads to a decrease of the current. On the other hand, a flywheel current is held by turning either one of the transistors ON. Application of the flywheel current can reduce hysteresis loss and keep power consumption low.

Moreover, high-frequency noise such as higher harmonics can be reduced. An electromagnetic current IL flowing through the electromagnetic winding 111 can be detected by measuring this flywheel current with the current detection circuit 139. The control circuit 137 determines a pulse width per cycle through pulse width modulation by comparing a current command value with a detected value obtained by the current detection circuit 139, and transmits a resultant signal to gates of the transistors 131, 132.

In a case where the current command value is greater than the detected value, both of the transistors 131, 132 are turned ON once for a period of time equivalent to a pulse width time period Tp1 within one cycle Ts (e.g., Ts=100 µs), as shown in FIG. 8. At this moment, the electromagnetic current IL increases.

However, when the current command value is lower than the detected value, both of the transistors 131, 132 are turned OFF once for a period of time equivalent to a pulse width time period Tp2 within the cycle Ts, as shown in FIG. 9. At this moment, the electromagnetic current IL decreases.

Here, a pulse width Tp is obtained using the current command value IR, the electromagnetic current IL, an electromagnetic inductance Lm, an electromagnetic resistance Rm, and a power supply voltage Vd. According to Kirchhoff's laws, Equation 1 is established between the electromagnetic current IL flowing through the electromagnetic winding 111 and the power supply voltage Vd.

$$Lm \times \frac{dIL}{dt} = Vd - IL \times Rm \quad \text{[Equation 1]}$$

Therefore, the pulse width Tp necessary to change the current value by IR-IL can be obtained by Equation 2.

$$Tp = \frac{Lm \times (IR - IL)}{Vd - IL \times Rm} \quad \text{[Equation 2]}$$

The power supply voltage Vd here is reduced by an AC input power supply 1 and thereafter by an AC/DC main power supply 3 and a DC/DC converter 5. This power supply voltage Vd is input to an electromagnetic power amplifier 7 and used as a power supply of the excitation circuit 110 (see Japanese Patent Application Laid-open No. 2003-293980).

Note that an output of the AC/DC main power supply 3 is input to a motor drive circuit 9 to supply power to a motor 121. An output of the DC/DC converter 5 is input to a small auxiliary power supply 11 and then formed into a control power supply of 5 V, +15 V, −15 V and the like, which is transmitted to the control circuit 137. The control circuit 137 has a built-in digital signal processor (DSP) 15.

As described above, a reduced voltage obtained through the DC/DC converter 5 is used as the power supply voltage Vd. Therefore, compared with an output voltage of the AC/DC main power supply 3 that fluctuates significantly depending on the rotational state of the motor 121, such as its acceleration or deceleration state, the power supply voltage Vd is constantly stable. Hence, in the conventional configuration, the output of the electromagnetic power amplifier 7 can be controlled stably without taking the fluctuations of the power supply voltage into much consideration. However, the conventional power supply device is equipped with such a DC/DC converter 5 for obtaining the power supply voltage Vd, and is therefore large and has a costly circuit. In addition, the conventional power supply device has a large number of parts, hence the higher failure rate.

Further, a product having a control device integrated with a vacuum pump has become mainstream recently but does not have enough circuit-mounting space. Thus, it is crucial to reduce the size of the product. In this regard, there is an example in which an electromagnetic power amplifier of a bearingless motor is driven with a high voltage of a main power supply without using a DC/DC converter (see Japanese Patent Application Laid-open No. 2010-200524). In this example, however, fluctuations of the voltage power supply are not taken into much consideration, leading to deterioration of the stability of the magnetic bearing.

SUMMARY

The present invention was contrived in view of these conventional issues, and an object thereof is to provide a magnetic bearing device that ensures reduction in cost of its circuit and size reduction by omitting a DC/DC converter that has been used to obtain a control power supply voltage of a magnetic bearing. The present invention also aims to provide a vacuum pump having such magnetic bearing device.

The present invention (claim 1), therefore, has a rotor, position detection means for detecting a radial position or an axial position of the rotor, magnetic bearing means for controlling the radial position or the axial position with an electromagnet, an excitation circuit that includes a switching element for connecting/disconnecting between the electromagnet and a power supply, electromagnetic current detection means for detecting a current flowing through the electromagnet, power supply voltage detection means for detecting a voltage of the power supply, and pulse width calculation means for calculating, at each timing, a pulse width for operating pulse control for the switching element, wherein the pulse width is calculated based on the voltage detected by the power supply voltage detection means and the current detected by the electromagnetic current detection means.

The pulse width is calculated based on the voltage of the power supply detected by the power supply voltage detection means and the current detected by the electromagnetic current detection means. Changes in the pulse width can be reduced by an increase of the voltage, achieving stable control of a magnetic bearing. In other words, stable control of the magnetic bearing can be ensured by changing the electromagnetic amplification control characteristics in accordance with the power supply voltage. According to such configuration, an electromagnetic power amplifier can be driven at a high voltage without a DC/DC converter, realizing reduction in cost and size of the circuit. The failure rate of the circuit can be reduced as well.

According to the present invention (claim 2), first correction calculation is performed based on a current error between a current value of the current detected by the electromagnetic current detection means and a current command value, second correction calculation is performed based on the pulse width at the present, third correction calculation is performed based on a voltage drop caused by a resistive component of the electromagnet, and errors of DC components that are included in the third correction calculation and the second correction calculation are corrected by integration.

Errors of DC components that occur in the second correction calculation and the third correction calculation are corrected by integration. In other words, an integral compensation term is added in addition to a predictive control loop in order to reduce DC errors of a current that occur due to an error in predictive control on a PWM-controlled pulse width.

According to the present invention (claim 3), a switching frequency for connecting/disconnecting the switching element of the excitation circuit is an even multiple of a carrier frequency of the position detection means.

It is assumed that the higher the power supply voltage, the higher the risk of the occurrence of noise due to PWM control. Therefore, penetration of noise into the position detection means can be prevented by synchronizing the switching frequency, which is used to connect/disconnect the switching element of the excitation circuit, to a level twice the carrier frequency of the position detection means. Accordingly, even when the power supply voltage is high, stable magnetic bearing control can be performed without a DC/DC converter.

In addition, the present invention (claim 4) has a rotor, position detection means for detecting a radial position or an axial position of the rotor, magnetic bearing means for controlling the radial position or the axial position with an electromagnet, an excitation circuit that includes a switching element for connecting/disconnecting between the electromagnet and a power supply, and electromagnetic current detection means for detecting a current flowing through the electromagnet, wherein the electromagnetic current detection means is disposed on a ground side of the switching element.

Because the electromagnetic current detection means is disposed on the ground side of the switching element, detection of the current flowing through the electromagnet is barely affected by a voltage swing of the electromagnet even when the power supply voltage is high. Therefore, an electromagnetic current with less noise can be obtained at a low cost. Moreover, because the electromagnetic current detection means is disposed on the ground side of the switching element, a high voltage is not applied when detecting the current, eliminating the need to use current measuring means for accommodating high voltages. In addition, although a voltage swing of the electromagnet causes noise, a noise filter (e.g., a low pass filter) cannot be used in order to measure a correct current value due to a cyclical waveform of the current of the electromagnet to be detected. For this reason, the conventional configurations are susceptible to noise. On the other hand, by disposing the electromagnetic current detection means on the ground side of the switching element as described in the present invention (claim 4), an electromagnetic current can be obtained with a high degree of accuracy and at a low cost without using a noise filter. Therefore, the electromagnetic power amplifier can be driven at a high voltage without a DC/DC converter, realizing reduction in cost and size of the circuit. The failure rate of the circuit can be reduced as well.

According to the present invention (claim 5), the electromagnetic current detection means consists of at least a resistive element and a differential amplifier, voltages of both ends of the resistive element, which are generated as a result of a voltage drop of the resistive element caused by the current flowing through the electromagnet, are input to the differential amplifier, and the current flowing through the electromagnet is detected based on an output voltage of the differential amplifier.

Accordingly, an electromagnetic current can be obtained with a high degree of accuracy without being affected by noise, even when the power supply voltage is high.

The present invention (claim 6) is also a vacuum pump having the magnetic bearing device according to any one of claims 1 to 5.

A product having a control device integrated with the vacuum pump can be made small. Thus, the vacuum pump can be employed anywhere with less installation space.

According to the present invention described above, the pulse width is calculated based on the voltage of the power supply detected by the power supply voltage detection means and the current detected by the electromagnetic detection means. Therefore, changes in the pulse width can be reduced by an increase of the voltage, achieving stable control of the magnetic bearing. In other words, stable control of the magnetic bearing can be ensured by changing the electromagnetic amplification control characteristics in accordance with the power supply voltage.

An electromagnetic power amplifier can be driven at a high voltage without a DC/DC converter, realizing reduction in cost and size of the circuit. The failure rate of the circuit can be reduced as well.

DETAILED DESCRIPTION

Figure 1:
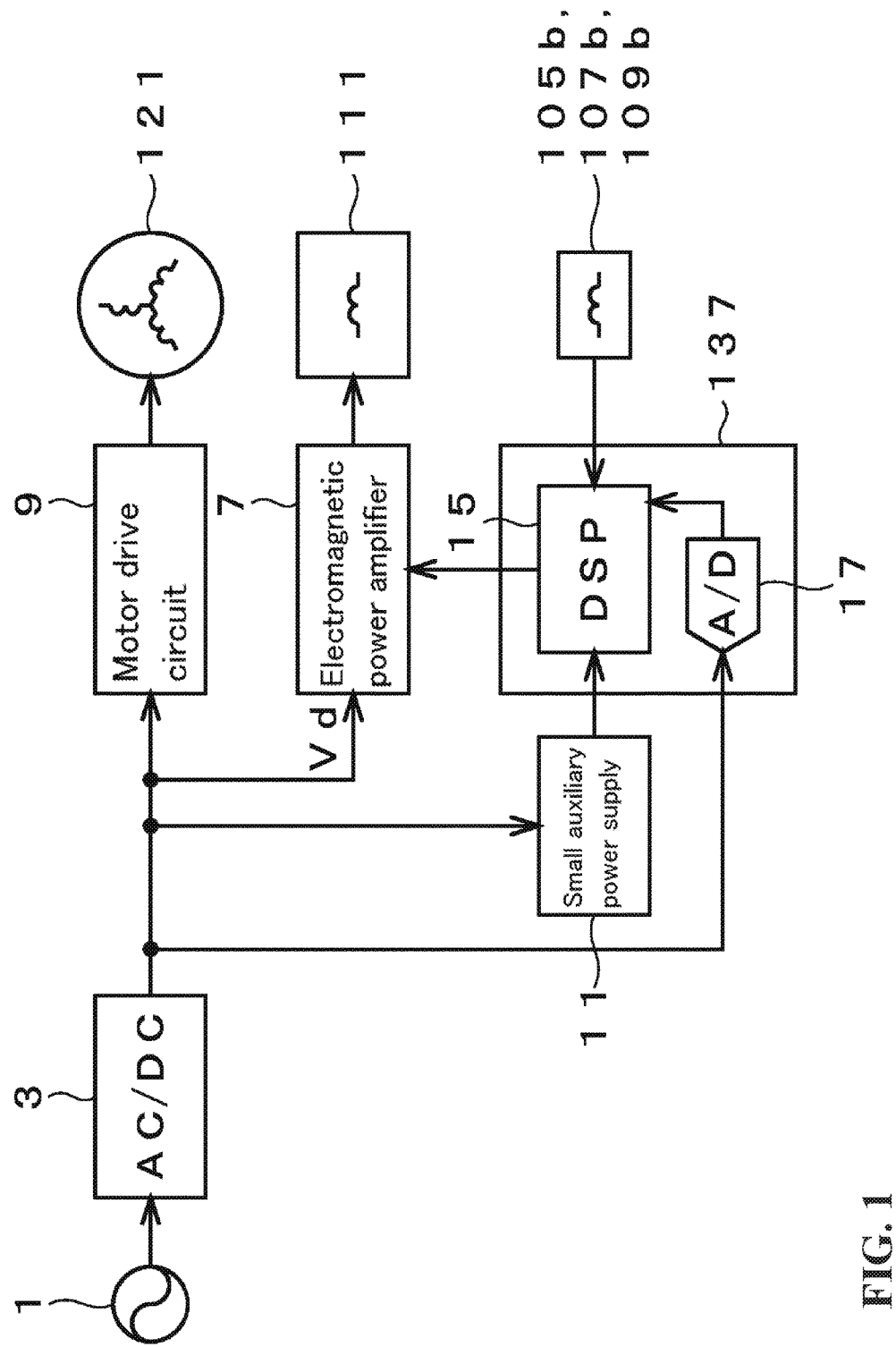
FIG. 1 is a block diagram showing the entire configuration of an embodiment of the present invention.
Figure 10:
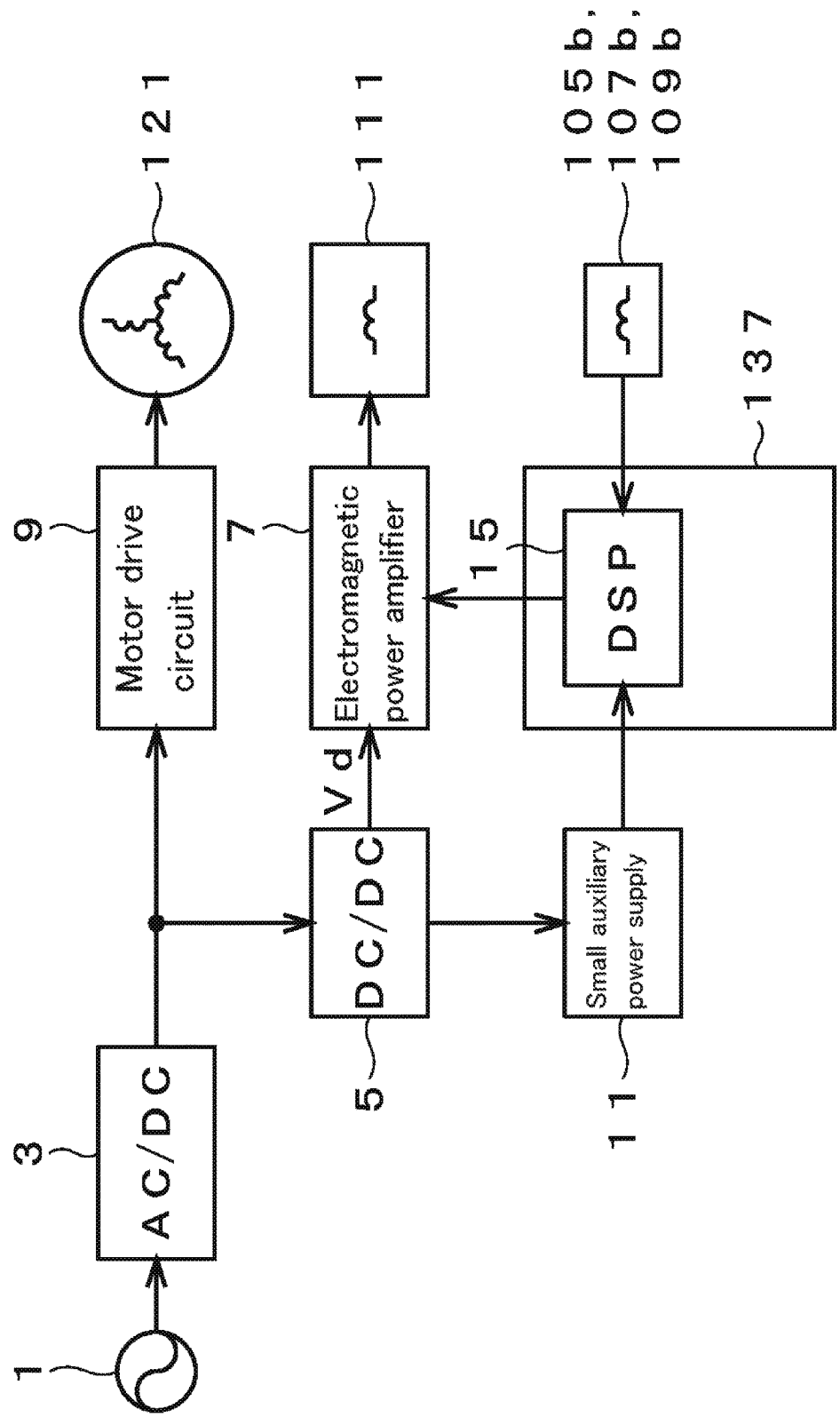
FIG. 10 is a block diagram showing the entire conventional configuration.

An embodiment of the present invention is described hereinafter. FIG. 1 shows a block diagram of the entire configuration of the embodiment of the present invention. Unlike the entire conventional configuration shown in the block diagram of FIG. 10, the embodiment of the present invention does not have the DC/DC converter 5 that has conventionally been used. An output voltage of the AC/DC main power supply 3 is input directly to the electromagnetic power amplifier 7 and small auxiliary power supply 11 without being reduced.

In other words, the power supply voltage Vd is kept as high as approximately 120 V to 140 V. The power supply voltage Vd ranges from 120 V during normal operation up to approximately 140 V because the voltage sometimes increases to approximately 140 V depending on the state of regeneration from the motor 121.

As shown in FIG. 1, the power supply voltage Vd, which is an output voltage of the AC/DC main power supply 3, is input to an A/D converter 17 of the control circuit 137, subjected to analogue/digital conversion therein, and then input to the DSP 15. A pulse width signal that is calculated based on this power supply voltage Vd by the DSP 15 of the control circuit 137 is transmitted to the gates of transistors 131, 132 shown in the magnetic bearing excitation circuit 110 of the electromagnetic power amplifier 7 shown in FIG. 2.

First of all, in a case where the current command value IR is greater than the detected electromagnetic current IL (mode 1), an arithmetic equation expanded by the software of the control circuit 137 based on Equation 1 becomes Equation 3.

$$\hat{I}L(n+1) = \frac{P(n) \times Vd \times Tp(n)}{Lm} + \frac{(Lm - RmTs)}{Lm} IL(n) \quad \text{[Equation 3]}$$

$$(P(n) = 1.0)$$

In Equation 3, P(n) represents a polarity, and IL (with a circumflex) (n+1) represents an estimated electromagnetic current value obtained at a timing following a timing n. Similarly, in a case where the current command value IR is smaller than the detected electromagnetic current IL (mode 2), an arithmetic equation expanded by the software of the control circuit 137 becomes Equation 4.

$$\hat{I}L(n+1) = \frac{P(n) \times Vd \times Tp(n)}{Lm} + \frac{(Lm - RmTs)}{Lm} IL(n) \quad \text{[Equation 4]}$$

$$(P(n) = -1.0)$$

As a result, Equation 5 is established by Equation 3 and Equation 4.

$$\text{where } \hat{I}L(n+1) = IL(n), \quad \text{[Equation 5]}$$

$$Tp(n) = \frac{IL(n)RmTs}{Vd}$$

Therefore, when the pulse width Tp(n) is low at the timing n, the level of the current drops even in the mode 1. Furthermore, Equation 6 is established.

$$\text{where } Tp = 0, \quad \text{[Equation 6]}$$

$$\Delta I = \frac{RmTs}{Lm} IL(n)$$

A pulse width Tp(n+1) is expressed by Equation 7.

$$Tp(n+1) = P(n+1)\frac{KA \times Lm}{Vd} \quad \text{[Equation 7]}$$

$$\left\{ IR(n+1) - \frac{P(n) \times Vd \times Tp(n)}{Lm} - \frac{Lm - 2RmTs}{Lm} IL(n) \right\}$$

In Equation 7, KA represents a feedback gain, a current command value IR(n+1) represents a current command value obtained at a timing following the timing n, and IL(n) represents the electromagnetic current value measured this time.

The polarity of this P(n+1) may be set such that the pulse width Tp(n+1) is a positive value. Therefore, the mode 1 is established when P(n+1)>0, and the mode 2 is established when P(n+1)≤0.

The electromagnetic inductance Lm is derived with the number of coil turns N, a gap length 1, a gap area S, and a magnetic permeability μ, as shown in Equation 8 below.

$$Lm = N^2 \frac{s}{l} \mu \quad \text{[Equation 8]}$$

$$\mu = f(i)$$

The magnetic permeability μ changes significantly due to the hysteresis characteristics of the electromagnet, depending on the electromagnetic current IL. Thus, Equation 9 is established by expressing the pulse width Tp(n+1) in a different form.

$$Tp(n+1) = P(n+1)\frac{KA \times Lo}{Vd} \left\{ (IR(n+1) - IL(n)) \times KL - \quad \text{[Equation 9]}\right.$$

$$\left. \frac{P(n) \times Vd \times Tp(n)}{Lo} + \frac{2RmTs}{Lo} IL(n) \right\}$$

Variable KL represents an inductance correction gain, a correction coefficient for correcting a reference value L0 of the electromagnetic inductance based on the level of the electromagnetic current IL to be detected. The greater the constant current value for the electromagnetic current IL, the lower the electromagnetic inductance Lm becomes. Therefore, the inductance correction gain needs to be lowered.

Figure 3:
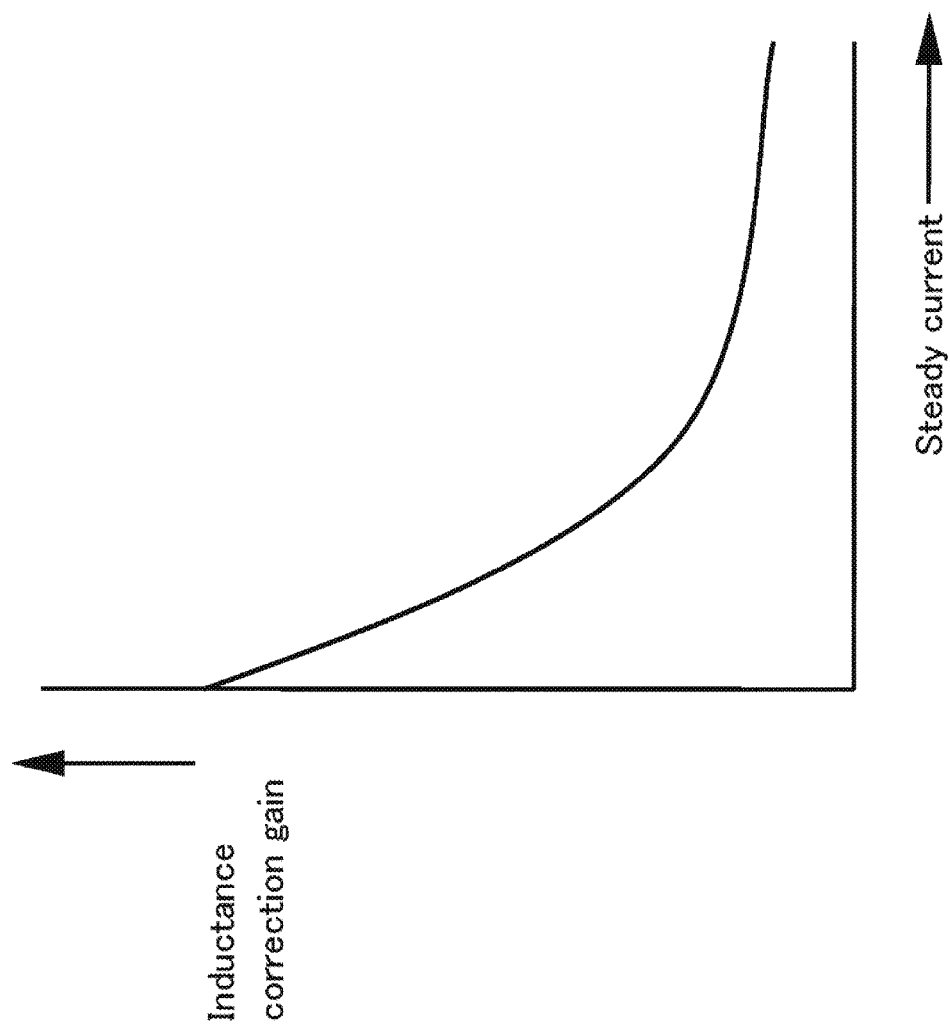
FIG. 3 is a diagram showing the relationship between KL and electromagnetic current IL.
Figure 4:
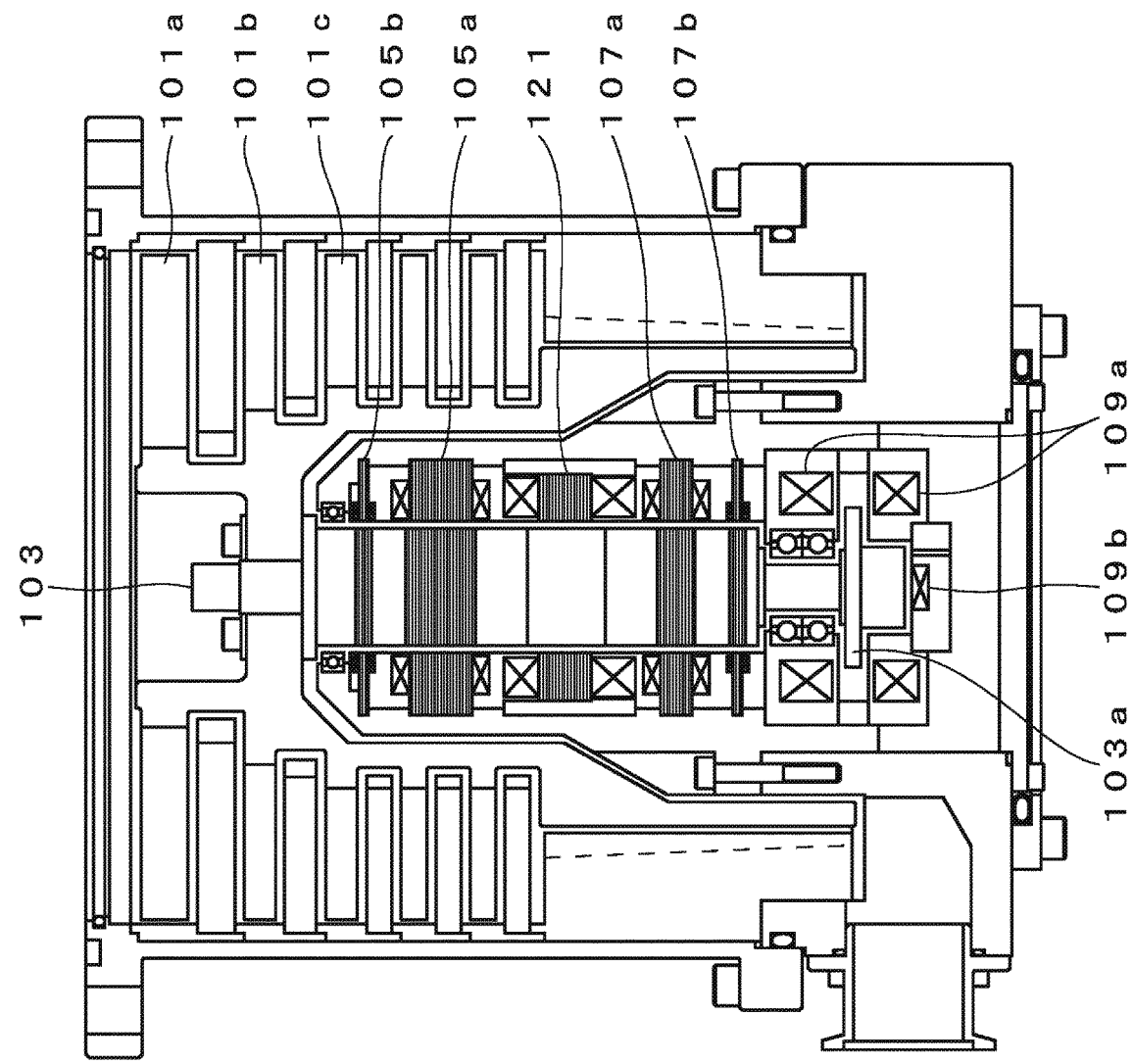
FIG. 4 is a cross-sectional view of a turbo-molecular pump.
Figure 5:
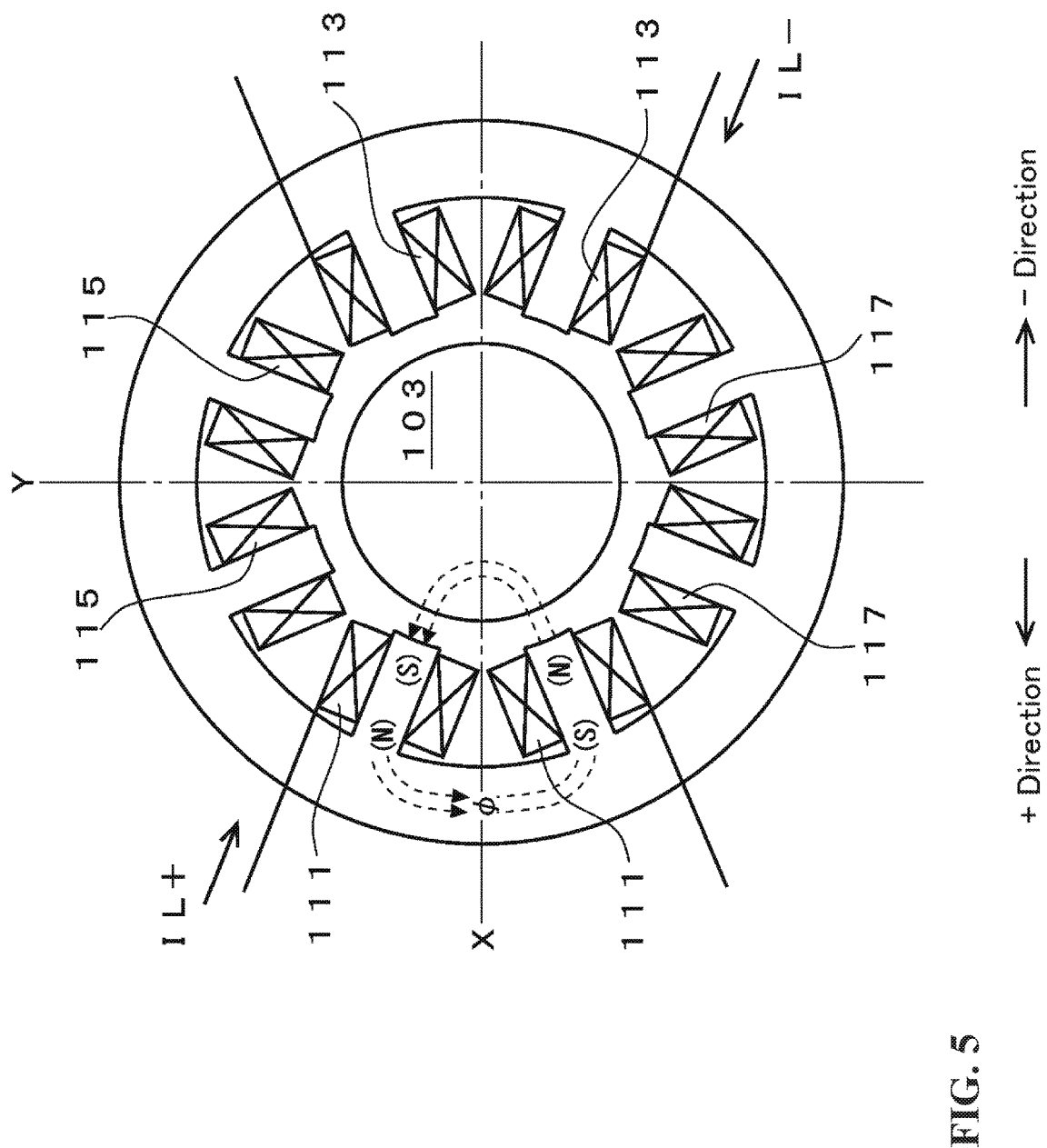
FIG. 5 is a lateral cross-sectional view of a radial electromagnet.
Figure 6:
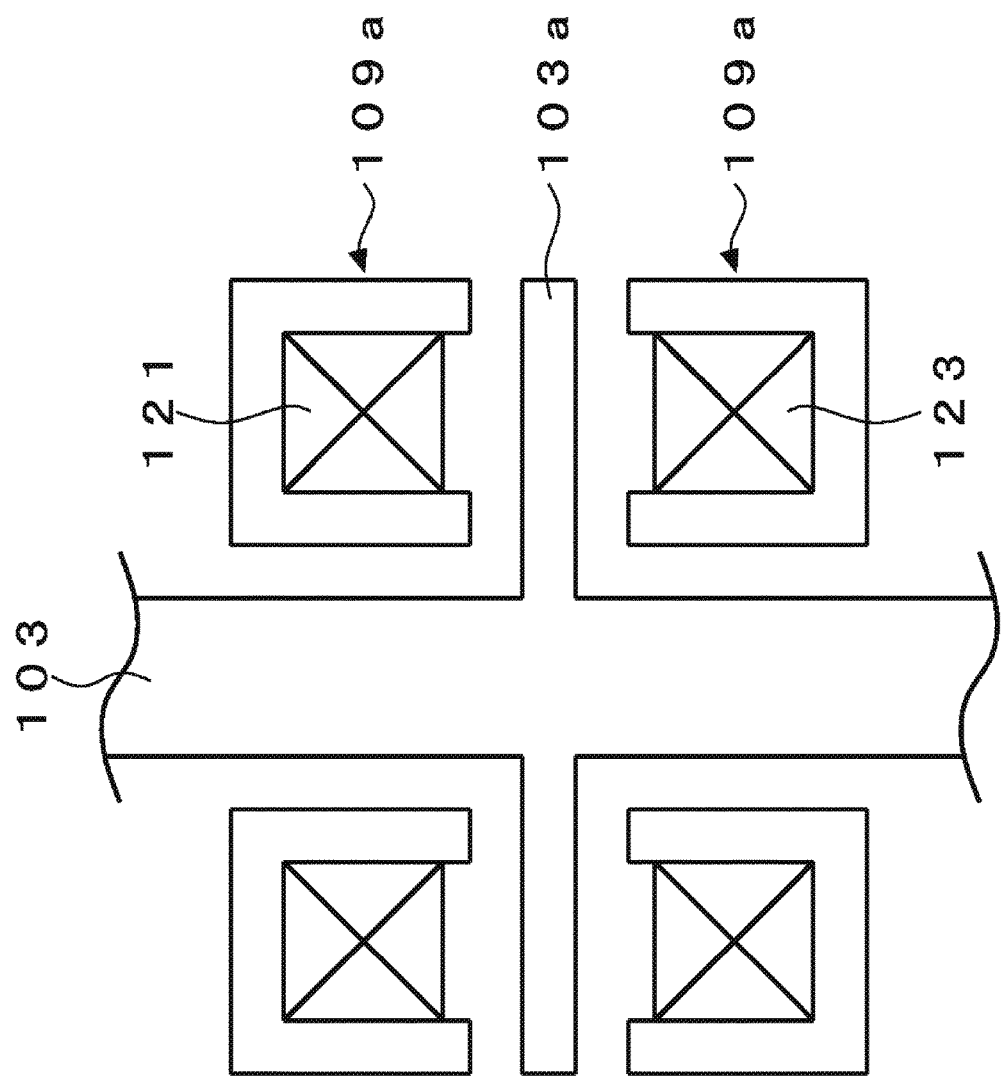
FIG. 6 is a longitudinal cross-sectional view of an axial electromagnet.
Figure 7:
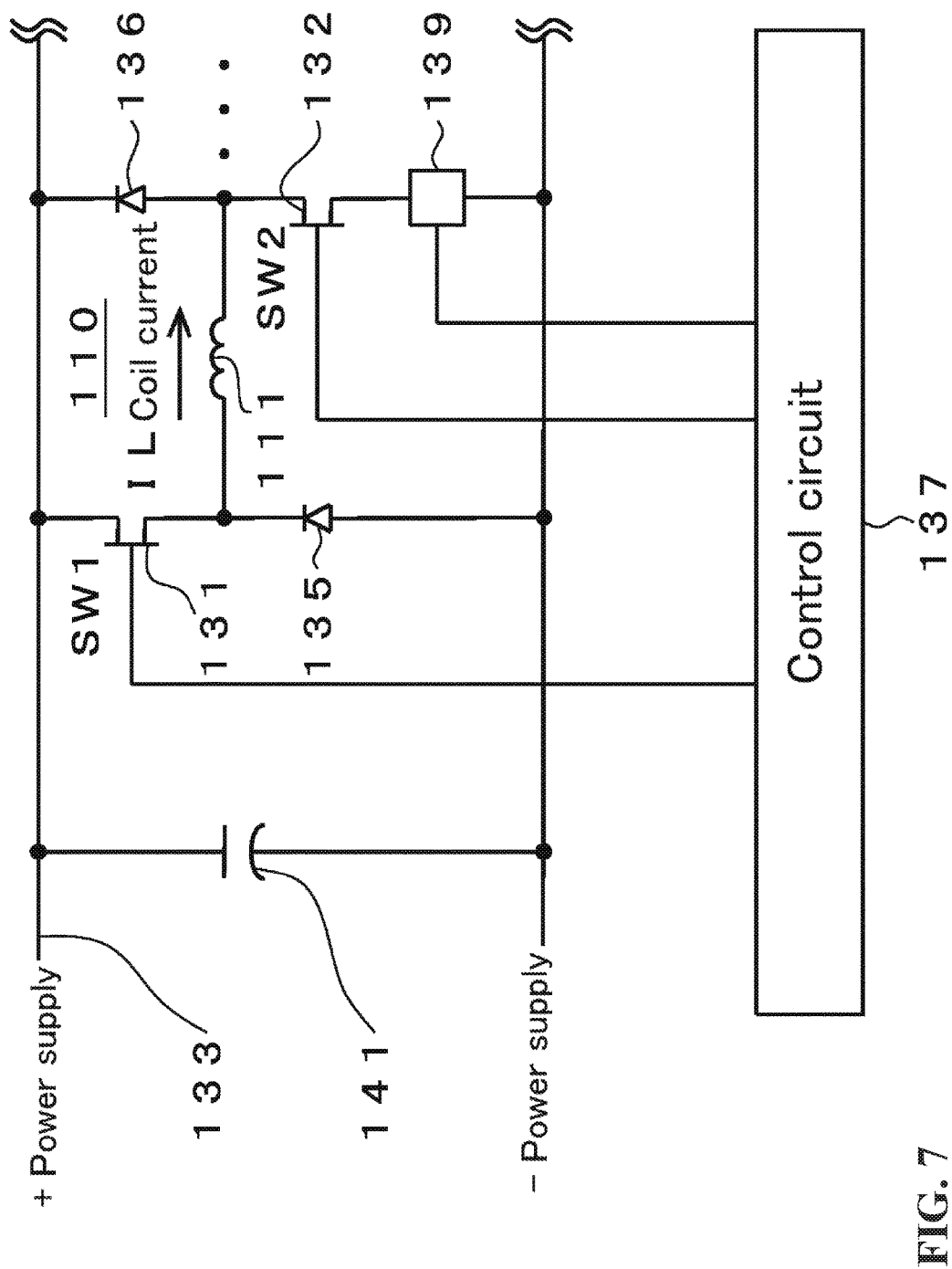
FIG. 7 shows an example of a conventional magnetic bearing excitation circuit.
Figure 8:
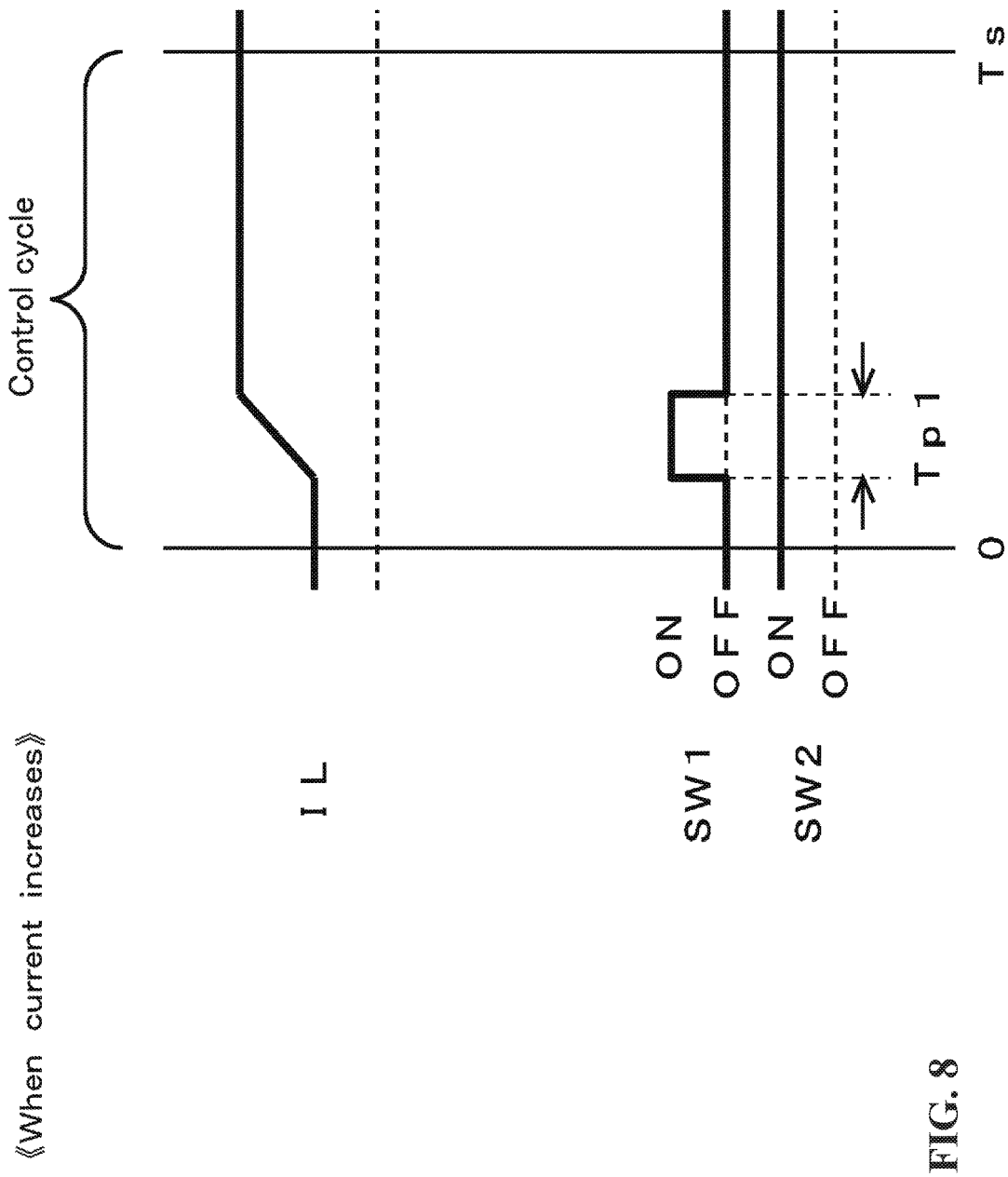
FIG. 8 is a time chart of control performed when a current command value is greater than a detected value.
Figure 9:
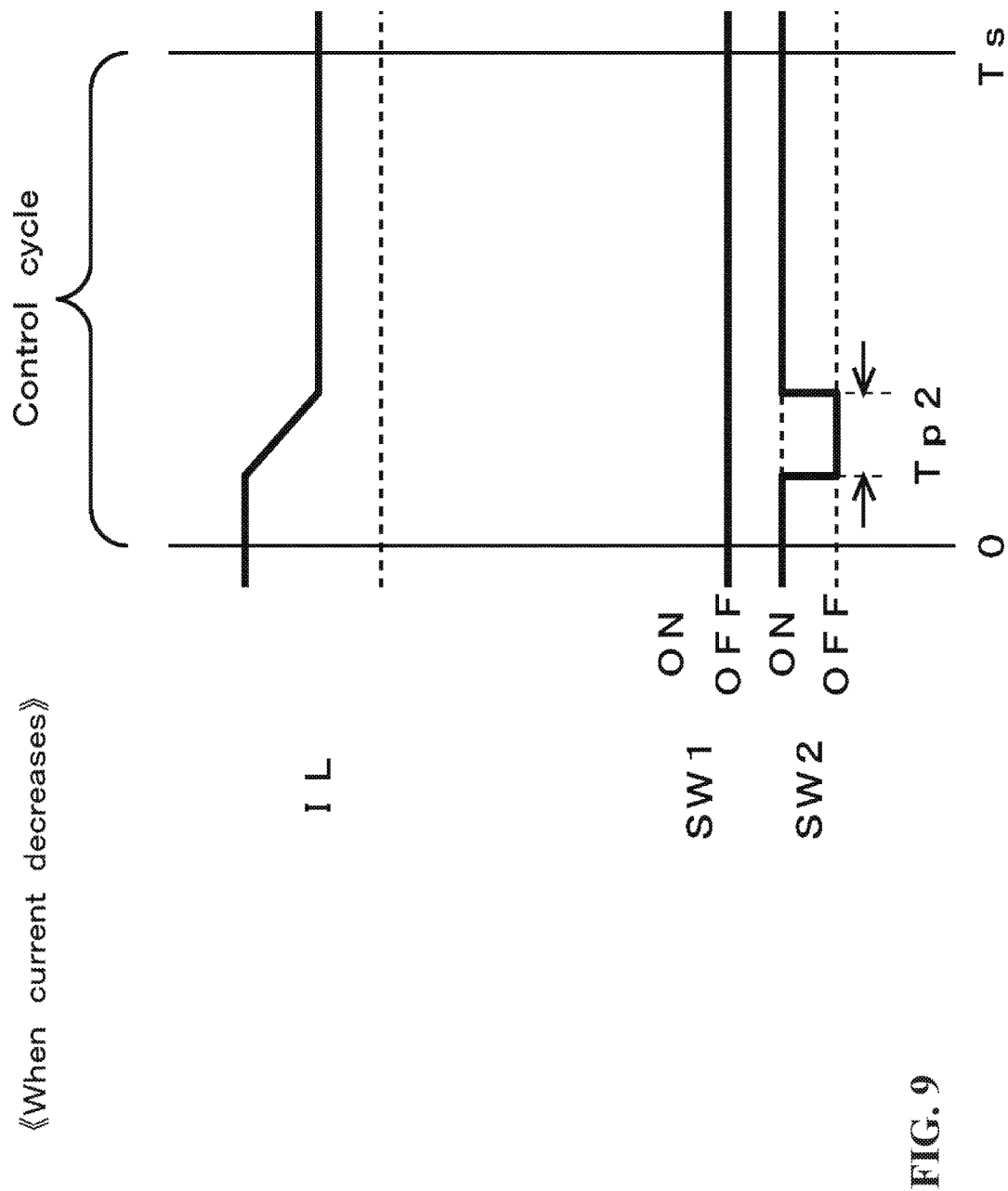
FIG. 9 is a time chart of control performed when the current command value is smaller than the detected value.

The relationship between the KL and the electromagnetic current IL is shown in FIG. 3. The term corresponding to (IR(n+1)−IL(n))×KL, which is the first term of Equation 9, functions to correct a current error between the current command value IR calculated by the DSP 15 and the electromagnetic current IL that is actually detected.

The term corresponding to P(n)×Vd×Tp(n)/L0, which is the second term of Equation 9, functions to make a correction using the current pulse width to determine the next pulse width. A microcomputer of the DSP 15 calculates samples every certain period of time. Therefore, a gap occurs between the calculation times, and hence there is a possibility that the value of the current that actually flows changes between a certain calculation time and the next calculation time. This gap between the calculation time is corrected using the second term with the previous pulse width. However, such correction made by the second term does not have to immediately reflect the calculation result at the timing immediately subsequent to the current timing. For instance, several pulse widths may be calculated first and then the calculation results may be reflected after confirming the absence of the impacts of noise and the like.

Moreover, a resistive component is actually present in the electromagnetic winding 111, and a voltage drop occurs due to the resistive component. Therefore, the term corresponding to 2RmTsIL(n)/L0, which is the third term of Equation 9, functions to correct the voltage drop that occurs due to the resistive component.

The corrections made using the second and third terms of Equation 9 ideally and theoretically function in relation to AC components. However, realistically speaking, it is difficult to define the reference value L0 of the electromagnetic inductance and the electromagnetic resistance Rm, hence errors with respect to the theoretical values due to production variations and operation environments occur.

For this reason, the errors with respect to DC components remain in the form of offset components. Such DC errors that are caused by the corrections using the second and third terms of Equation 9 are corrected by adding an integration term as a fourth term, as shown in Equation 10. In other words, for the purpose of reducing DC errors of a current that occur due to an error in predictive control on the PWM-controlled pulse width, an integral compensation term is provided in addition to a predictive control loop.

$$Tp(n+1) = P(n+1)\frac{KA \times Lo}{Vd} \left\{ (IR(n+1) - IL(n)) \times KL - \quad \text{[Equation 10]}\right.$$

-continued $$\frac{P(n) \times Vd \times Tp(n)}{Lo} + \frac{2RmTs}{Lo} IL(n) + Yi(n) \bigg\}$$

Here, as shown by Equation 11, Yi(n) is obtained by accumulating, at each timing, a value obtained by multiplying, by Ki, a current error between the current command value IR calculated by the DSP 15 and the electromagnetic current IL that is actually detected.

$$Yi(n)=Ki \times (IR(n+1)-IL(n))+Yi(n-1) \quad \text{[Equation 11]}$$

Variable Ki represents an integral action coefficient shown by Equation 12 and is defined empirically. A sampling time Ts is, for example, 40 μs, and a frequency f is, for example, approximately 1 hertz.

$$Ki=2\pi fTs \quad \text{[Equation 12]}$$

Incidentally, upper and lower limits of the value of Yi(n) are determined and clamped. Further, the power supply voltage Vd is clamped not to become a certain level or low. Due to the presence of the term with the power supply voltage Vd in its denominator, as shown in Equation 10, the clamping is done so as to prevent oscillation and uncontrollability of the electromagnetic bearing excitation circuit.

According to this configuration, the magnetic bearing is controlled by the software of the DSP 15. The power supply voltage Vd is subjected to analogue/digital conversion by the AD converter 17, and the resultant value is introduced to the DSP 15. Then, the PWM-controlled pulse width corresponding to the power supply voltage Vd is calculated using Equation 10, to drive the electromagnetic winding 111.

For instance, when the power supply voltage Vd becomes 1.2 times higher as a result of breaking of the motor 121, controlling without taking the power supply voltage Vd into consideration leads to 1.2-time increase in the current at the same pulse width. Consequently, there arises a risk of an increase in the gain of the control loop and unstable magnetic bearing control.

However, controlling with Equation 10 can reduce the fluctuations of the pulse width by an increase of the voltage, realizing stable magnetic bearing control. In other words, stable magnetic bearing control can be ensured by changing the electromagnetic amplification control characteristics in accordance with the power supply voltage.

Accordingly, without a DC/DC converter, the electromagnetic power amplifier 7 can be driven at a high voltage, accomplishing reduction in cost and size of the circuit. The failure rate of the circuit can be reduced as well. By reducing the size of the product having a control device integrated with a vacuum pump, the vacuum pump can be employed anywhere with less installation space.

The above has described that the present embodiment consists of the software of the DSP 15; however, the present embodiment may consist of an electronic circuit as well.

Next, the impacts on the upper radial sensor 105*b*, lower radial sensor 107*b*, and axial radial sensors 109*b* in a case where the DC/DC converter 5 is omitted and the high voltage of the AC/DC main power supply 3 is used as the power supply voltage Vd are considered.

These displacement sensors are each driven at a carrier frequency of, for example, 25 kHz. In order to extract displacement signals of the displacement sensors with a high degree of accuracy, a coherent detection system is employed to modulate the displacement signals by means of a coherent detection pulse of a rectangular wave with a frequency equal to the carrier frequency.

However, although the coherent detection system has sensitivity with respect to, in addition to the fundamental, harmonics that are three, five or more times the fundamental, it does not have sensitivity with respect to harmonics that are twice the fundamental or four or more times the fundamental. Since the power supply voltage Vd is high in the present embodiment, the risk of the occurrence of noise by the PWM control is assumed to be higher compared to the conventional configuration.

Therefore, penetration of noise into each displacement sensor can be prevented by synchronizing the switching frequency of the electromagnetic winding 111 to a level twice the carrier frequency of each displacement sensor. Consequently, even when the power supply voltage Vd is high, stable magnetic bearing control can be performed without the DC/DC converter 5.

Figure 2:
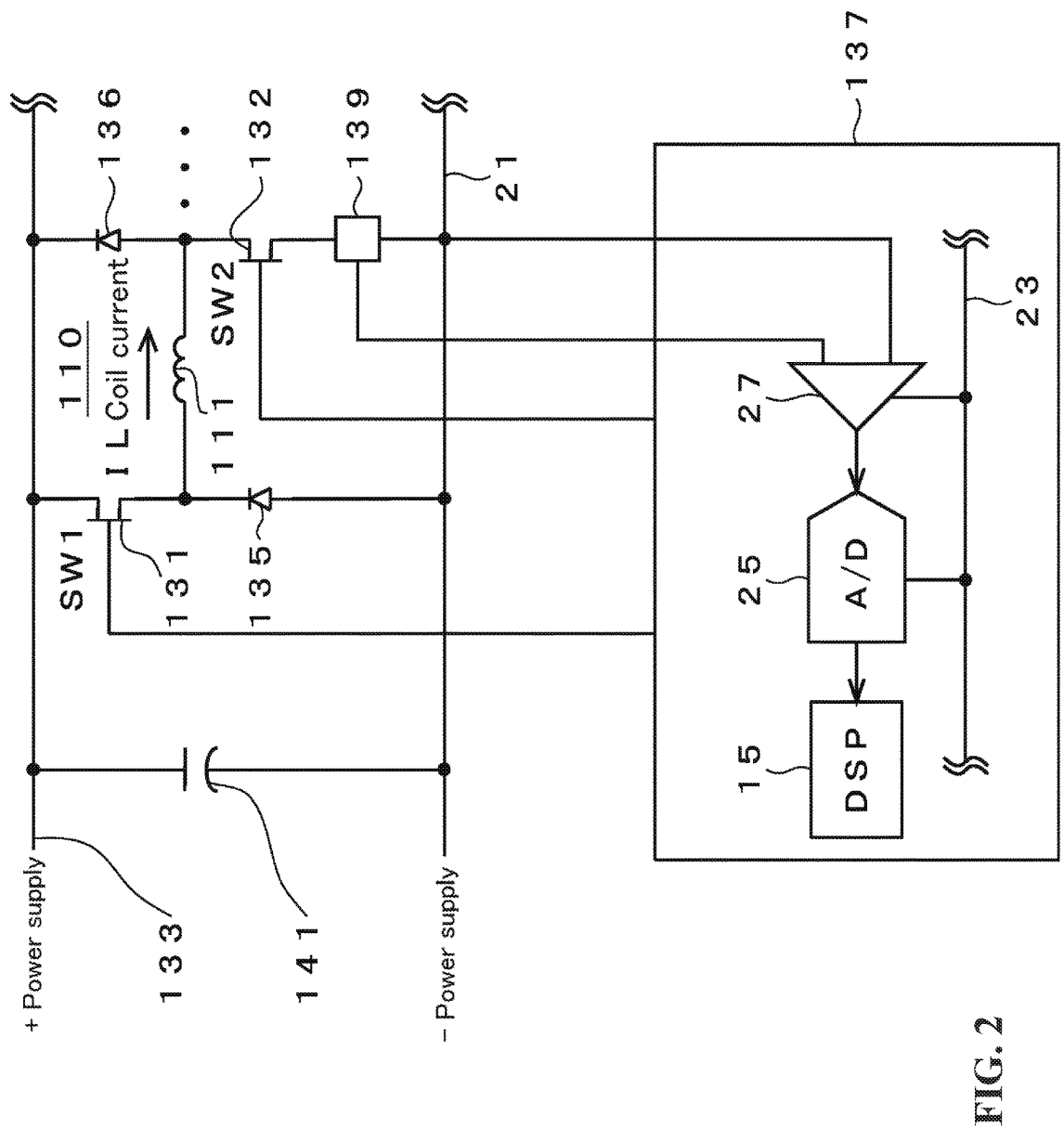
FIG. 2 shows a magnetic bearing excitation circuit (including a current detection interface)

Next, the impacts on detection of the electromagnetic current IL in a case where the DC/DC converter 5 is omitted and the high voltage of the AC/DC main power supply 3 is used as the power supply voltage Vd are considered. As shown in FIG. 2, the current detection circuit 139 is disposed on the ground side of the transistor 132, so that, even when the power supply voltage Vd is high in the present embodiment, the voltage swing of the electromagnetic winding 111 rarely affects detection of the electromagnetic current IL. This placement of the current detection circuit 139 can inhibit application of a high voltage thereto, eliminating the need to take into consideration the countermeasures for high voltages applied to the current detection circuit 139. Noise that is generated due to the voltage swing of the electromagnetic winding 111 cannot be subjected to a noise filter (e.g., a low pass filter) in order to measure a correct current value due to a cyclical waveform of the current of the electromagnet to be detected. However, disposing the current detection circuit 139 on the ground side of the transistor 132 can alleviate the impacts of the noise without using a noise filter. Therefore, the electromagnetic current IL with less noise can be obtained at a low cost.

The fact that the power supply voltage Vd is high enables a situation in which noise can be superimposed on a ground 21 of the excitation circuit 110 on the power supply voltage Vd side, as well as on a ground 23 of the control circuit 137, easily generating a potential between the grounds.

Therefore, instead of inputting the voltage extracted from the current detection circuit 139 directly into the A/D converter as in the conventional configuration having the DC/DC converter 5, the difference between the voltage extracted from the current detection circuit 139 and the voltage of the ground 21 is acquired by a differential amplifier 27, as can be seen in the current detection interface of the magnetic bearing excitation circuit shown in FIG. 2.

Such configuration of the present embodiment can obtain the electromagnetic current IL with a high degree of accuracy without being affected by noise even when the power supply voltage Vd is high. In addition, instead of obtaining in the differential amplifier 27 the difference between the voltage extracted from the current detection circuit 139 and the voltage of the ground 21 as described above, the difference between the voltage of the current detection circuit 139 and the voltage of one power supply may be obtained.

The present invention can be modified in various ways so long as such variations do not depart from the spirit of the present invention. The foregoing embodiments and such modifications can be combined in various ways.

EXPLANATION OF REFERENCE NUMERALS

1: Input power supply; 3: Main power supply; 5: DC/DC converter; 7: Electromagnetic power amplifier; 9: Motor drive circuit; 11: Small auxiliary power supply; 15: DSP; 17: A/D converter; 21, 23: Ground; 27: Differential amplifier; 103: Rotor; 105a: Upper radial electromagnet; 105b: Upper radial sensor; 107a: Lower radial electromagnet; 107b: Lower radial sensor; 109a: Axial electromagnet; 109b: Axial sensor; 110: Excitation circuit; 111: Electromagnetic winding; 121: Motor; 131, 132: Transistor; 133: Power supply; 135, 136: Diode; 137: Control circuit; 139: Current detection circuit

What is claimed is:

1. A magnetic bearing device, comprising:
a rotor;
position detection means for detecting a radial position or an axial position of the rotor;
magnetic bearing means for controlling the radial position or the axial position with an electromagnet;
an excitation circuit that includes a switching element for connecting and disconnecting the electromagnet and a power supply;
electromagnetic current detection means for detecting a current flowing through the electromagnet;
power supply voltage detection means for detecting a voltage of the power supply; and
pulse width calculation means for calculating, at each timing, a pulse width for operating pulse control for the switching element,
wherein the pulse width calculation means calculates the pulse width based on the voltage detected by the power supply voltage detection means and the current detected by the electromagnetic current detection means to correct a fluctuation of the voltage of the power supply.

2. The magnetic bearing device according to claim 1, further comprising correction calculation means for:
calculating a first correction based on a current error between a current value of the current detected by the electromagnetic current detection means and a current command value,
calculating a second correction based on the pulse width at the present, and
calculating a third correction based on a voltage drop caused by a resistive component of the electromagnet,
wherein errors of DC components that are included in the third correction and the second correction are corrected by integration.

3. The magnetic bearing device according to claim 1, wherein a switching frequency for connecting and disconnecting the switching element of the excitation circuit is an even multiple of a carrier frequency of the position detection means.

4. A magnetic bearing device, comprising:
a rotor;
position detection means for detecting a radial position or an axial position of the rotor;
magnetic bearing means for controlling the radial position or the axial position with an electromagnet;
an excitation circuit that includes a switching element for connecting/disconnecting between the electromagnet and a power supply;
electromagnetic current detection means for detecting a current flowing through the electromagnet;
power supply voltage detection means for detecting a voltage of the power supply;
pulse width calculation means for calculating, at each timing, a pulse width for operating pulse control for the switching element;
a first rectifier element connecting a first end of the electromagnet to a negative electrode of the power supply; and
a second rectifier element connecting a second end of the electromagnet to a positive electrode of the power supply,
wherein the pulse width is calculated based on the voltage detected by the power supply voltage detection means and the current detected by the electromagnetic current detection means,
wherein the switching element is configured by a first switching element connecting the first end of the electromagnet to a positive electrode of the power supply and a second switching element connecting the second end of the electromagnet to a negative electrode of the power supply; and
wherein the electromagnetic current detection means is disposed on a ground side of the second switching element.

5. The magnetic bearing device according to claim 1, wherein the electromagnetic current detection means consists of at least a resistive element and a differential amplifier, voltages of both ends of the resistive element, which are generated as a result of a voltage drop of the resistive element caused by the current flowing through the electromagnet, are input to the differential amplifier, and the current flowing through the electromagnet is detected based on an output voltage of the differential amplifier.

6. The vacuum pump comprising the magnetic bearing device according to claim 1.

7. The magnetic bearing device according to claim 2, wherein a switching frequency for connecting and disconnecting the switching element of the excitation circuit is an even multiple of a carrier frequency of the position detection means.

8. The magnetic bearing device according to claim 2, wherein the electromagnetic current detection means consists of at least a resistive element and a differential amplifier, voltages of both ends of the resistive element, which are generated as a result of a voltage drop of the resistive element caused by the current flowing through the electromagnet, are input to the differential amplifier, and the current flowing through the electromagnet is detected based on an output voltage of the differential amplifier.

9. The magnetic bearing device according to claim 3, wherein the electromagnetic current detection means consists of at least a resistive element and a differential amplifier, voltages of both ends of the resistive element, which are generated as a result of a voltage drop of the resistive element caused by the current flowing through the electromagnet, are input to the differential amplifier, and the current flowing through the electromagnet is detected based on an output voltage of the differential amplifier.

10. The magnetic bearing device according to claim 7, wherein the electromagnetic current detection means consists of at least a resistive element and a differential amplifier, voltages of both ends of the resistive element, which are generated as a result of a voltage drop of the resistive element caused by the current flowing through the electromagnet, are input to the differential amplifier, and the current flowing through the electromagnet is detected based on an output voltage of the differential amplifier.

11. The magnetic bearing device according to claim 4, wherein the electromagnetic current detection means consists of at least a resistive element and a differential amplifier, voltages of both ends of the resistive element, which are generated as a result of a voltage drop of the resistive element caused by the current flowing through the electromagnet, are input to the differential amplifier, and the current flowing through the electromagnet is detected based on an output voltage of the differential amplifier.

12. A vacuum pump comprising the magnetic bearing device according to claim 2.

13. A vacuum pump comprising the magnetic bearing device according to claim 3.

14. A vacuum pump comprising the magnetic bearing device according to claim 6.

15. A vacuum pump comprising the magnetic bearing device according to claim 4.

16. A vacuum pump comprising the magnetic bearing device according to claim 5.

17. A vacuum pump comprising the magnetic bearing device according to claim 8.

18. A vacuum pump comprising the magnetic bearing device according to claim 9.

19. A vacuum pump comprising the magnetic bearing device according to claim 10.

20. A vacuum pump comprising the magnetic bearing device according to claim 11.

* * * * *